(12) United States Patent
Ditzler

(10) Patent No.: US 8,590,835 B2
(45) Date of Patent: Nov. 26, 2013

(54) ELECTRICALLY POWERED DOWNLOCK ACTUATION SYSTEM

(75) Inventor: Adam Ditzler, Keller, TX (US)

(73) Assignee: Goodrich Corporation, Charlotte, NC (US)

( * ) Notice: Subject to any disclaimer, the term of this patent is extended or adjusted under 35 U.S.C. 154(b) by 649 days.

(21) Appl. No.: 12/777,997

(22) Filed: May 11, 2010

(65) Prior Publication Data

US 2011/0278394 A1 Nov. 17, 2011

(51) Int. Cl.
*B64C 25/26* (2006.01)

(52) U.S. Cl.
USPC .................................. 244/102 SL; 244/102 R

(58) Field of Classification Search
USPC .................. 244/100 R, 102 R, 102 A, 102 SL
See application file for complete search history.

(56) References Cited

U.S. PATENT DOCUMENTS

| 5,269,481 | A  | * | 12/1993 | Derrien | 244/102 R |
| 7,731,124 | B2 | * | 6/2010  | Griffin | 244/102 R |
| 8,267,350 | B2 | * | 9/2012  | Elliott et al. | 244/99.2 |
| 2007/0144342 | A1 |  | 6/2007 | Paulmann | |
| 2009/0250552 | A1 | * | 10/2009 | Kearns et al. | 244/102 A |
| 2010/0012779 | A1 | * | 1/2010 | Collins | 244/102 R |
| 2010/0116930 | A1 | * | 5/2010 | Griffin | 244/102 A |
| 2010/0219290 | A1 | * | 9/2010 | Luce | 244/102 SL |
| 2011/0147518 | A1 | * | 6/2011 | Nannoni et al. | 244/102 A |
| 2011/0233328 | A1 | * | 9/2011 | Alleau et al. | 244/102 R |
| 2012/0037752 | A1 | * | 2/2012 | Collins | 244/102 SL |
| 2012/0080559 | A1 | * | 4/2012 | Keller et al. | 244/102 A |

FOREIGN PATENT DOCUMENTS

EP 2107273 A2 * 10/2009
FR 2677950 A1 * 12/1992

* cited by examiner

*Primary Examiner* — Benjamin P Lee
(74) *Attorney, Agent, or Firm* — Snell & Wilmer L.L.P.

(57) ABSTRACT

An electrically-powered downlock actuation system for a landing gear that does not convert rotary motor output into linear motion during the actuation process, but instead uses the rotary motor output to directly drive a locking mechanism coupled to upper and lower landing gear braces. The electrically-powered downlock actuation system may include an electric motor, a gearbox (optional), a clutch (optional) and a fixed link to replace a hydraulically powered downlock actuation system. Further, the electrically-powered downlock actuation system may be controlled with motor control electronics that cooperate with one or more sensors arranged to detect a position of an output shaft.

20 Claims, 3 Drawing Sheets

ELECTRICALLY POWERED DOWNLOCK ACTUATION SYSTEM

FIELD OF THE INVENTION

This invention relates to an electrically powered downlock actuation system attachable to a landing gear brace, and more specifically to an electrically powered downlock actuation system that does not convert its rotary motor output into linear motion, but instead uses the rotary output to directly drive a landing gear brace locking mechanism.

BACKGROUND OF THE INVENTION

Typically, a hydraulic downlock actuator directly linked to a linkage operates to lock an aircraft landing gear in an extended or deployed configuration. Conventional downlock actuators are linear actuators that are typically small in overall size and have a relatively low output load. Many installations of these actuators on landing gear systems have tight physical operating envelopes, and thus it can be difficult to route hydraulic conduits to and from the downlock actuator.

FIGS. 1 and 2 show a landing gear brace and lock linkage system 100 having a brace 102 and a linkage 104 coupled to lock mechanisms 106, 108, respectively. A conventional, hydraulic downlock actuator 110 is mounted on the brace 102, but can be mounted in any number of configurations in order to operate the lock mechanism. The brace 102 and linkage 104 are locked into a desired configuration by the lock mechanisms 106, 108, which are controllable for locking and unlocking the brace 102 relative to the linkage 104 using the downlock actuator 110 and a set of springs 112. The actuator 110 is hydraulically powered and will hydraulically unlock the brace 102 relative to the linkage 104 by overcoming the spring force and other unlocking loads. The springs 112 are sized to pull the lock mechanisms 106, 108 into their locked positions with or without the aid of the downlock actuator 110. Conduits 114, which may take the form of hydraulic fluid lines, are arranged to be in fluid communication with the aircraft's hydraulic system.

SUMMARY OF THE INVENTION

At least one potential advantage of the present invention is to replace a hydraulically powered downlock actuation system with an electrically powered downlock actuation system to achieve an overall aircraft weight reduction. As such, at least one embodiment describes an electrically-powered downlock actuation system for a landing gear that does not convert rotary motor output into linear motion during the actuation process, but instead uses the rotary motor output to directly drive a locking mechanism coupled to a landing gear brace. The electrically-powered downlock actuation system may include an electric motor, an optional gearbox, an optional clutch and a fixed link to replace the hydraulically powered downlock actuation system. Further, the electrically-powered downlock actuation system described herein may not include some of the components associated with more conventional electrically-powered linear electric actuators that tend to be bulky, long and less reliable.

In one example of the invention, a lock linkage system for braces of a landing gear system includes a lockable assembly having braces coupled to a linkage that is lockable in a desired position relative to the braces. The system further includes a downlock actuator having an electric motor; an output shaft having a first end portion and a second end portion, the first end portion coupled to the electric motor; and a link pivotally coupled to the second end portion of the shaft, the link having a distal end coupled to the lockable assembly.

In another example of the invention, a downlock actuator for a landing gear system includes an electric motor having a motor output shaft with a rotary axis; an output shaft coupled to the motor and having a rotary axis; and a link pivotally coupled to the output shaft, the link having a longitudinal axis arranged substantially perpendicular to the rotary axis of the output shaft.

In yet another example of the invention, a method for locking upper and lower braces of an aircraft landing gear system in a desired relationship with each other includes the steps of (1) rotating an electric motor in a desired rotational direction; (2) moving an output shaft coupled to the motor through a desired angular range, wherein a speed of the output shaft is proportional to a speed of the motor; and (3) moving a link having a first end portion pivotally coupled to the output shaft, the link having an opposite end portion coupled to a lockable assembly configured to lock the braces in the desired relationship depending on a position of the link.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

In the following description, certain specific details are set forth in order to provide a thorough understanding of various embodiments of the invention. However, one skilled in the art will understand that the invention may be practiced without these details. In other instances, well-known structures associated with aircraft, aircraft landing gear systems, downlock actuators and the operation thereof have not necessarily been shown or described in detail to avoid unnecessarily obscuring descriptions of the embodiments of the invention.

The following description generally relates an electrically powered downlock actuation system for landing gear braces, such as the braces making up a landing gear drag brace or side brace. A number of issues arise when attempting to convert a linear landing gear downlock actuator from being hydraulically actuated to being electrically actuated. For example, the electrical actuation components should fit substantially within the same space constraints or spatial envelope, not substantially increase the weight of the overall downlock actuation system, and minimize force inefficiencies in the overall landing gear design. Generally, electrically powered, linear actuators may lose efficiency in converting rotary motor output into linear motion using a mechanical device such as a ballscrew or rollerscrew. These types of mechanical devices for converting rotary motor output to linear motion tend to be larger, heavier and possibly more complex combined with a lower reliability and maintainability rating. Consequently, one embodiment of the present invention includes an electrically-powered downlock actuation system for a landing gear that does not convert rotary motor output into linear motion during the actuation process, but instead uses the rotary motor output to directly drive a locking mechanism coupled to a landing gear brace.

Figure 1:
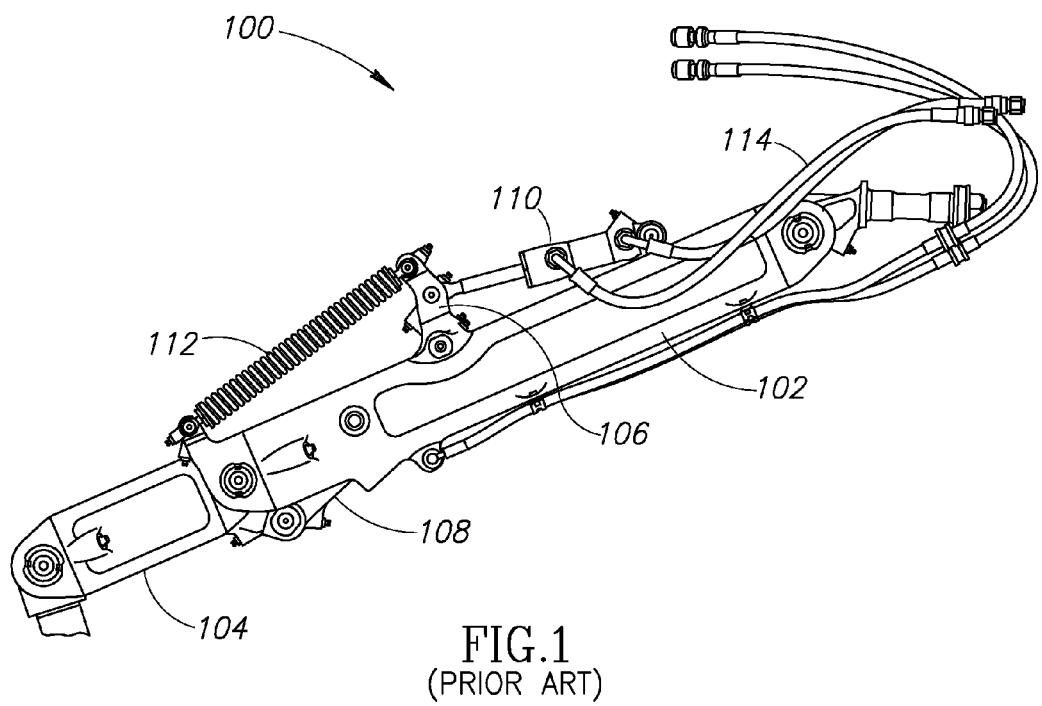
FIG. 1 shows a side elevational view of a conventional, hydraulically-powered downlock actuation system for a landing gear system.
Figure 2:
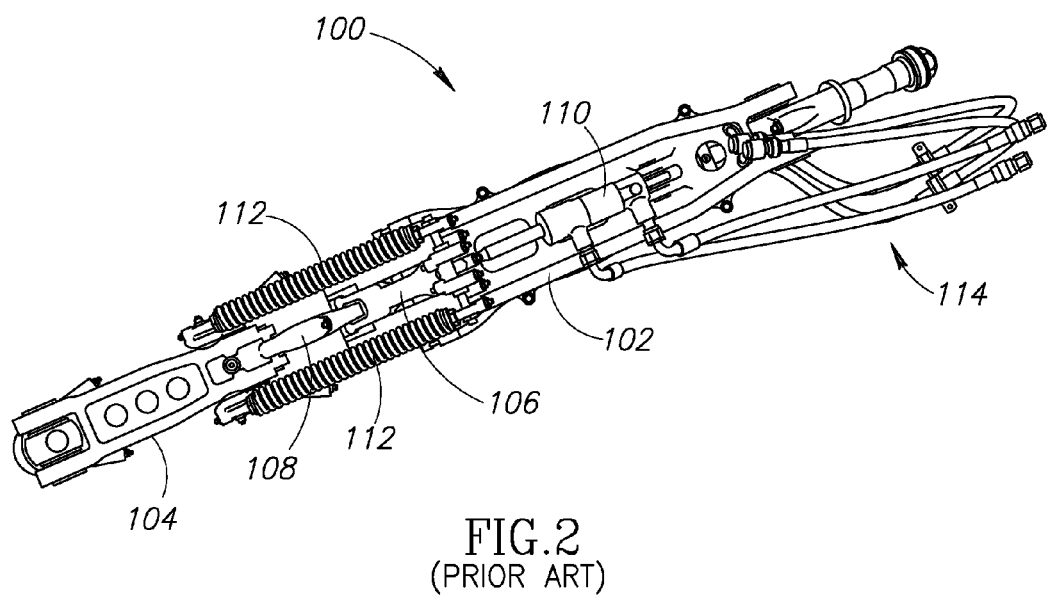
FIG. 2 shows a top plan view of the conventional, hydraulically-powered downlock actuation system of FIG. 1.
Figure 3:
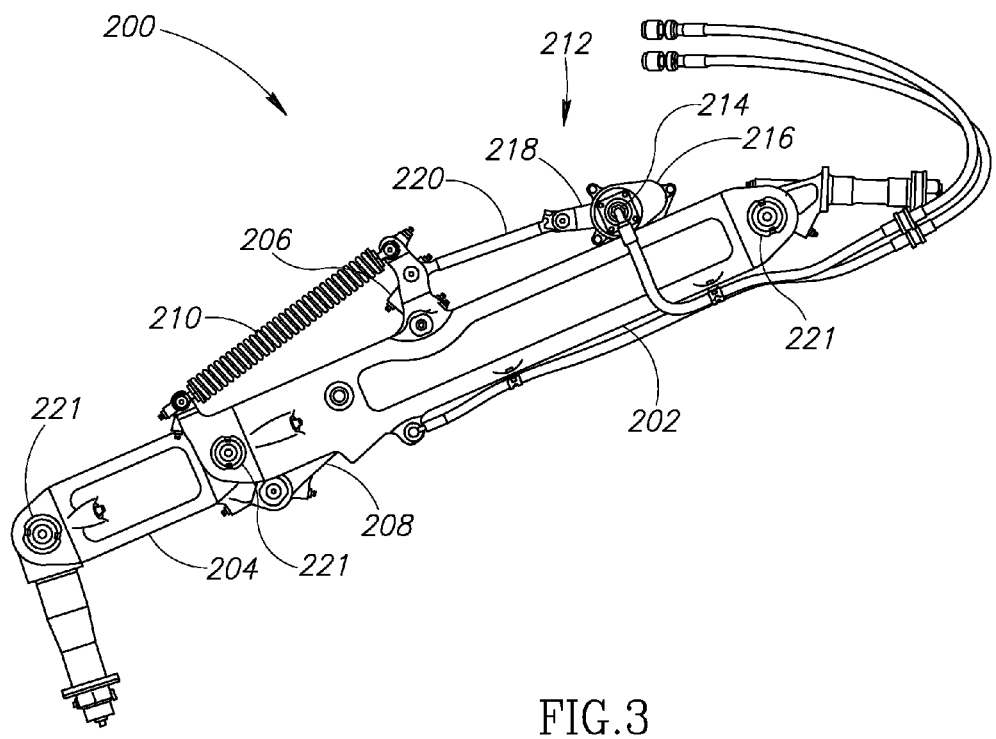
FIG. 3 shows a side elevational view of an electrically-powered downlock actuation system for a landing gear system according to an embodiment of the present invention.
Figure 4:
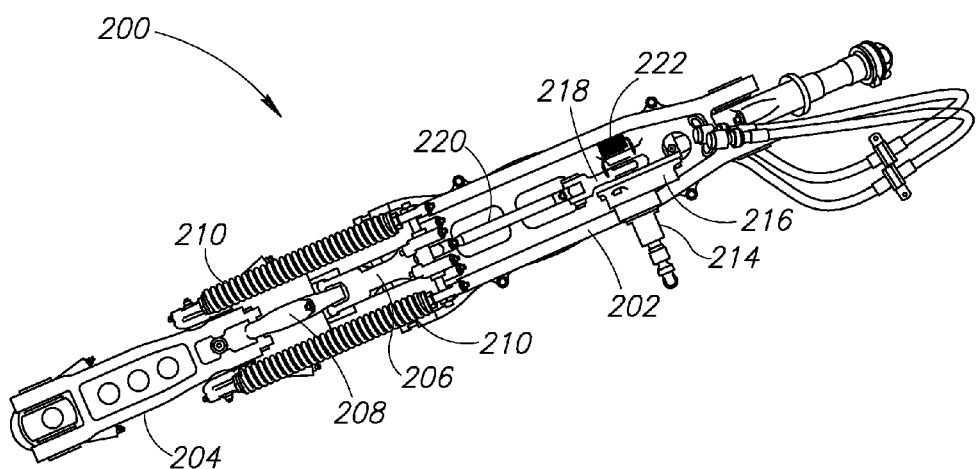
FIG. 4 shows a top plan view of the electrically-powered downlock actuation system of FIG. 3.

FIGS. 3 and 4 show a landing gear brace and locking linkage system 200 that operates a upper brace 202 relative to a lower brace 204, such as by moving (e.g., rotating) the lower brace 204 relative to the upper brace 202. The braces 202, 204 are coupled together via upper and lower lock links 206, 208, respectively. Lock springs 210 attach to the upper brace 202 and upper lock link, 206; although there are many other ways that the springs can be attached and they may be attached to different parts. The springs 210 may take the form of extension springs that provide a tensile force to pull the upper lock link 206 into a locked position, but other types of springs may be used.

The illustrated embodiment shows an electrically powered downlock actuator 212 that may replace or be initially installed in lieu of a conventional hydraulic downlock actuator. The electrically powered downlock actuator 212 may take the form of an electric rotary mechanism with no linear motion output. By way of example, the downlock actuator 212 may include an electric motor 214, an optional gearbox 216, an output shaft 218 (extending from either the motor or gearbox) and a link 220, which may take the form of a fixed-length link. The motor 214 and the gearbox 216 may be rigidly mounted to the upper brace 202. Electrical power cords are arranged to supply electrical power to the motor 214.

The electric motor 214 may be positioned such that a rotary output shaft (not shown) is substantially perpendicular to the linear direction of motion required. Stated alternatively, the rotary output shaft of the motor 214 may be positioned substantially perpendicular to a longitudinal axis of the link 220 and/or perpendicular to a plane of motion defined as a plane that is orthogonal to the axes of the coupling pins 221. In turn, the link 220 couples to the output shaft 218 at a location off of a centerline of the gearbox rotation and the link 220 also couples to the lock link 206. In one embodiment, the link 220 operates to drive motion in the lock links 204, 206. The electric motor 214 may include motor control electronics that are programmable to control an angular position of the gearbox output shaft 218. In one embodiment, the motor control electronics can be programmed using output position feedback detected by a position sensor.

The optional gearbox 216 may include a clutch or similar mechanism (not shown) that cooperates with the position sensor (not shown), in which the latter detects a position of the output shaft 218. In one embodiment, a signal from the position sensor will cause the drive torque from the motor 214 to be disconnected from the gearbox 216 or output shaft 218 after the landing gear brace and the lock linkage assembly 200 has been positively unlocked. In addition, the gearbox 216 may provide a speed reduction such that operation of the motor 214 would produce a limited angular range of motion of the output shaft 218. The motor control electronics could also be used to provide precise control of a position of the output shaft 218 over a desired angular range, which may be a limited angular range. Preferably, the output shaft 218 rotates about the rotary output shaft of the gearbox 216.

Figure 5A:
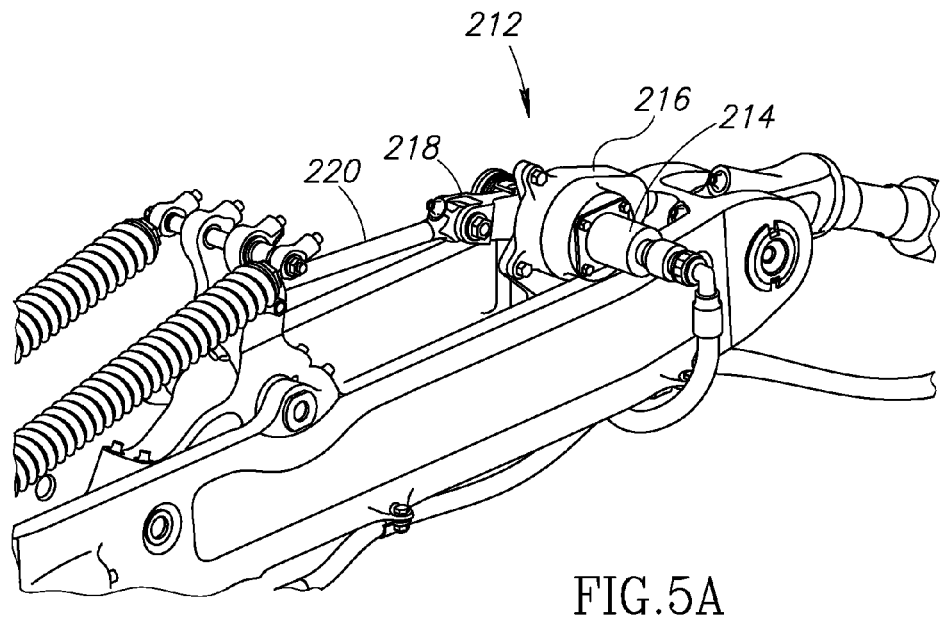
FIG. 5A shows a close-up perspective view of the electrically-powered downlock actuation system of FIG. 3 with the link positioned at a locking angle with the linkage approximately in-line with the brace.

FIGS. 3 and 5A show the link 220 and the output shaft 218 at a minimum angle relative to a longitudinal axis of the upper brace 202. During operation of the landing gear brace and lock linkage system 200, the upper brace 202 is unlocked when the motor 214 is powered to rotate the output shaft 218 in a clockwise direction from the minimum angle position. Once the landing gear brace and lock linkage system 200 has been positively unlocked, the link 220 is not needed to provide a continued force, which is similar when a conventional hydraulic downlock actuator is employed, and a retract mechanism (not shown) continues to fold the landing gear brace and lock linkage system 200 during a landing gear retraction. From this point and through the rest of the motion that the landing gear brace and lock linkage system 200 articulates during retraction, the link 220 and the other components of the downlock actuator 212 are positioned as to not hinder the retraction of the landing gear.

Figure 5B:
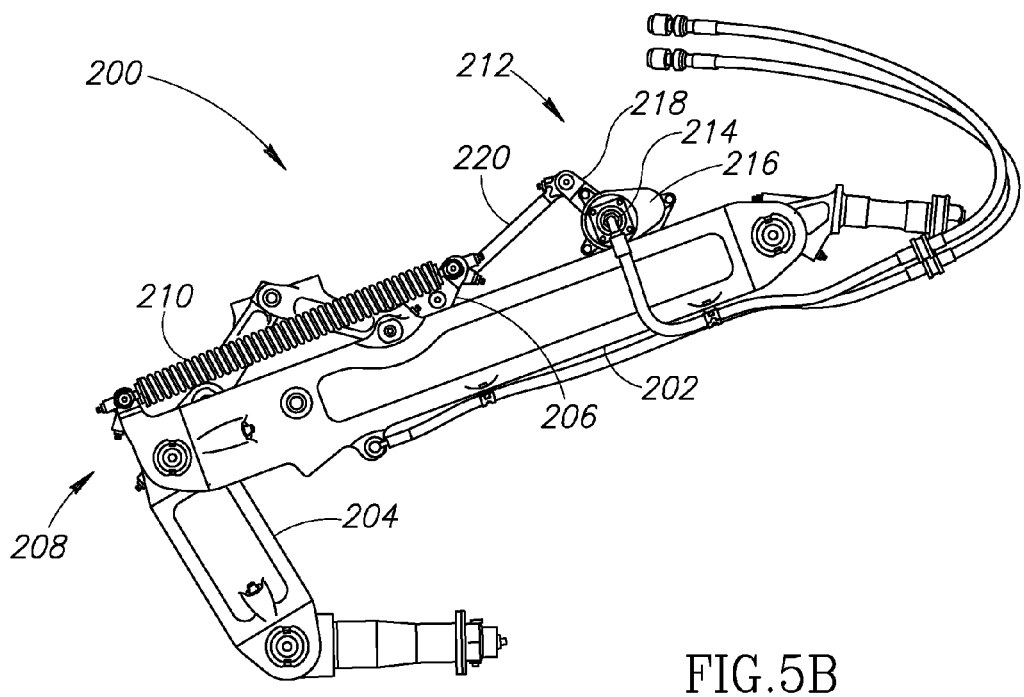
FIG. 5B shows a side elevational view of the electrically-powered downlock actuation system of FIG. 3 with the link positioned at a maximum angle with the linkage out-of-line with respect to the brace.

FIG. 5B shows the link 220 and the output shaft 218 at a maximum angle relative to the longitudinal axis of the upper brace 202. In the maximum angle position, the lower brace 204 is moved to its maximum point of travel relative to the upper brace 202, which may be referred to as a maximum folded position which would occur during some mid-retracted or fully retracted position of the landing gear. In addition, the illustrated embodiment shows the output shaft 218 is at a maximum clockwise rotational position. During a landing gear extension, the connection between the motor 214 and the gearbox 216 may be disconnected by the clutch so that the link 220 can travel freely to accommodate the motion of the landing gear brace and lock linkage system 200 until the output shaft 218 is within a desired, limited range, which may be determined by the position sensor.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A lock linkage system for use with a landing gear system, the lock linkage system comprising:
a lockable assembly having an upper landing gear brace defining a longitudinal axis, a lower landing gear brace, and a linkage coupled to the upper and lower braces for allowing movement of the upper and lower braces relative to one another between locked and unlocked positions; and
a downlock actuator comprising
an electric motor having a rotary output shaft;
a connecting shaft having a first end portion and a second end portion, the first end portion coupled to the rotary output shaft of the electric motor; and
a link having a proximal end pivotally coupled to the second end portion of the connecting shaft and a distal end coupled to the linkage of the lockable assembly,
wherein the motor is mounted to the upper brace, and the link and braces are mounted for movement relative to one another in a common plane between the locked and unlocked positions.

2. The lock linkage system of claim 1, further comprising a clutch and an output shaft position sensor arranged to permit disengagement of the motor from the connecting shaft after the braces and linkage have been positively unlocked.

3. The lock linkage system of claim 1, wherein the link is a fixed-length link.

4. The lock linkage system of claim 1, wherein the link is pivotally coupled to the second end portion of the connecting shaft at a location offset from a centerline rotational axis of the rotary output shaft of the motor.

5. The lock linkage system of claim 1, wherein a rotary output shaft of the electric motor is positioned substantially perpendicular to a longitudinal axis of the link.

6. The lock linkage system of claim 1, further comprising a gearbox to provide a desired amount of speed change between the motor and the connecting shaft.

7. The lock linkage system of claim 1, wherein the electric motor is controlled to produce a desired angular range of motion of the connecting shaft.

8. The lock linkage system of claim 1, wherein the electric motor includes motor control electronics programmable to control an angular position of the connecting shaft.

9. A lock linkage system according to claim 1, wherein the link is mounted for longitudinal translation relative to the longitudinal axis of the upper brace and rotation relative to the connecting shaft whereby the proximal end of the link moves away from the upper brace and the distal end of the link moves toward the upper brace to unlock the braces from the locked position to the unlocked position.

10. A downlock actuator for a landing gear system, the downlock actuator comprising:
an electric motor having a rotary output shaft with a rotary axis;
a connecting shaft coupled to the motor and having a rotary axis; and
a link having a proximal end pivotally coupled to the connecting shaft, a distal end configured and adapted to couple to a lockable assembly which includes a linkage and braces moveable relative to one another between locked and unlocked positions, the link having a longitudinal axis arranged substantially perpendicular to the rotary axis of the rotary output shaft of, the motor,
wherein the link and connecting shaft are configured and adapted to couple the rotary output shaft of the motor to the linking of lockable assembly such that the braces, link, and connecting shaft move relative to one another in a common plane as the braces move between the locked and unlocked position.

11. The downlock actuator of claim 10, further comprising a clutch located within a gearbox housing.

12. The downlock actuator of claim 10, further comprising a position sensor arranged to detect a position of the connecting shaft.

13. The downlock actuator of claim 10, wherein the link is a fixed-length link.

14. The downlock actuator of claim 10, wherein the longitudinal axis of the link is laterally offset from a centerline rotational axis of the connecting shaft.

15. The downlock actuator of claim 10, wherein the electric motor is controllable to produce a desired angular range of motion of the connecting shaft.

16. A method for locking upper and lower braces of an aircraft landing gear system in a desired relationship with each other, the method comprising:
rotating an electric motor in a desired rotational direction;
moving a connecting shaft coupled to a rotary output shaft of the motor through a desired angular range, the connecting shaft having a first end portion coupled to the rotary output shaft, and a second end portion, wherein a speed of the connecting shaft is proportional to a speed of the rotary output shaft of the motor; and
moving a link having a proximal end portion pivotally coupled to the second end portion of the connecting shaft and a distal end portion coupled to a lockable assembly which includes a linkage and braces moveable relative to one another between locked and unlocked positions,
wherein the link, braces, and connecting shaft are configured to move relative to one another in a common plane, and to lock the braces in the desired relationship depending on a position of the link.

17. The method of claim 16, further comprising decoupling the electric motor from the connecting shaft.

18. The method of claim 16, wherein moving the connecting shaft includes reducing the speed of the connecting shaft relative to the speed of the rotary output shaft of the motor through a gearbox.

19. The method of claim 16, further comprising detecting a position of the connecting shaft with a position sensor located proximate the connecting shaft.

20. The method of claim 16, further comprising controlling the electric motor using motor control electronics, wherein controlling includes limiting the desired angular range of the connecting shaft.

* * * * *

UNITED STATES PATENT AND TRADEMARK OFFICE
CERTIFICATE OF CORRECTION

PATENT NO. : 8,590,835 B2  
APPLICATION NO. : 12/777997  
DATED : November 26, 2013  
INVENTOR(S) : Adam Ditzler It is certified that error appears in the above-identified patent and that said Letters Patent is hereby corrected as shown below:

In the Claims:

In Column 5 Line 38, after "shaft of", please delete ",".

In Column 5 Line 41, please delete "linking" and insert therefor --linkage--.

In Column 5 Line 44, please delete "position" and insert therefor --positions--.

Signed and Sealed this
Twenty-fifth Day of March, 2014

Michelle K. Lee
*Deputy Director of the United States Patent and Trademark Office*